(12) United States Patent
Massow et al.

(10) Patent No.: US 10,024,649 B2
(45) Date of Patent: Jul. 17, 2018

(54) DISPERSION ENCODED FULL RANGE OPTICAL COHERENCE TOMOGRAPH

(71) Applicant: Wavelight GmbH, Erlangen (DE)

(72) Inventors: Ole Massow, Bergen (DE); Johannes Loerner, Erlangen (DE)

(73) Assignee: Wavelight GmbH (DE)

( * ) Notice: Subject to any disclaimer, the term of this patent is extended or adjusted under 35 U.S.C. 154(b) by 0 days.

(21) Appl. No.: 15/305,324

(22) PCT Filed: Jun. 17, 2014

(86) PCT No.: PCT/EP2014/062666
§ 371 (c)(1),
(2) Date: Oct. 19, 2016

(87) PCT Pub. No.: WO2015/192886
PCT Pub. Date: Dec. 23, 2015

(65) Prior Publication Data
US 2017/0089688 A1    Mar. 30, 2017

(51) Int. Cl.
*G01B 9/02* (2006.01)

(52) U.S. Cl.
CPC ..... *G01B 9/02044* (2013.01); *G01B 9/02058* (2013.01); *G01B 9/02083* (2013.01); *G01B 9/02091* (2013.01)

(58) Field of Classification Search
CPC ............ G01B 9/02044; G01B 9/02058; G01B 9/02083; G01B 9/02091
See application file for complete search history.

(56) References Cited

U.S. PATENT DOCUMENTS

| 2012/0044455 A1* | 2/2012 | Hirose | G01B 11/2441 351/206 |
| 2014/0063506 A1* | 3/2014 | Kang | G01B 9/02044 356/451 |

FOREIGN PATENT DOCUMENTS

| WO | 2012/098194 A1 | 7/2012 |
| WO | 2012/151547 A3 | 11/2012 |
| WO | 2013/117699 A1 | 8/2013 |

OTHER PUBLICATIONS

Hofer B et al., "Dispersion encoded full range frequency domain optical coherence tomography," Optics Express, OSA (Optical Society of America), Washington DC. (US), vol. 17, No. 1, Jan. 5, 2009 (Jan. 5, 2009), pp. 7-24, ISSN: 1094-4087.

(Continued)

*Primary Examiner* — Michael A Lyons
(74) *Attorney, Agent, or Firm* — Keiko Ichiye

(57) ABSTRACT

An apparatus for optical coherence tomography (OCT) comprises a light source, a first arm, a second arm, and a processing unit. The first arm has a first dispersive optical assembly that induces a first amount of dispersion into light from the light source and traversing the first arm, where the first arm is one of a sample arm and a reference arm of an interferometer. The second arm has a second dispersive optical assembly that induces a second amount of dispersion into light from the light source and traversing the second arm, where the second arm is the other of the sample arm and reference arm. The second amount of dispersion is larger than the first amount of dispersion. The processing unit processes an interferometry signal to perform OCT, where the interferometry signal represents a superposition of the light from the first arm and the light from the second arm.

7 Claims, 4 Drawing Sheets

(56) References Cited

OTHER PUBLICATIONS

Maciej Wojtkowski et al., "Ultrahigh-resolution, high-speed, Fourier domain optical coherence tomography and methods for dispersion compensation," Optics Express, OSA (Optical Society of America), Washington DC. (US), vol. 12. No. 11., May 31, 2004 (May 31, 2004), pp. 2404-2422, ISSN: 1094-4087.
Hofer Bernd et al., "Fast dispersion encoded full range optical coherence tomography for retinal imaging at 800 nm and 1060 nm", Optics Express, vol. 18, No. 5, Mar. 1, 2010, pp. 4898-4919.
Felix Kottig et al., "An advanced algorithm for dispersion encoded full range frequency domain optical coherence tomography," Optics Express, vol. 20, No. 22, Oct. 22, 2012 (Oct. 22, 2012), p. 24925-24948, ISSN: 1094-4087.
S. Witte et al., "Single-shot two-dimensional full-range optical coherence tomography achieved by dispersion control," Optics Express, vol. 17, No. 14, Jul. 6, 2009 (Jul. 6, 2009), p. 11335-11349, ISSN: 1094-4087.
Hofer et al., "Fast dispersion encoded full range OCT for retinal imaging at 800 nm and 1060 nm," Optical Coherence Tomography and Coherence Domain Optical Methods in Biomedicine XV, Proc. of SPIE, (2011), vol. 7889, pp. 788907-01-788907-07, XP 60006383A.

* cited by examiner

DISPERSION ENCODED FULL RANGE OPTICAL COHERENCE TOMOGRAPH

CROSS REFERENCE TO RELATED APPLICATIONS

This application is a section 371 national stage phase of International Application No. PCT/EP2014/062666, filed 17 Jun. 2014, titled "DISPERSION ENCODED FULL RANGE OPTICAL COHERENCE TOMOGRAPH," which is hereby incorporated by reference in its entirety.

TECHNICAL FIELD

The present invention relates to optical coherence tomography, OCT. It relates in particular to an apparatus for Dispersion Encoded Full Range, DEFR, optical coherence tomography and a method for manufacturing same.

BACKGROUND

The term "Optical Coherence Tomography", OCT, defines a group of optical measuring techniques wherein the (limited) coherence length of light is used for high precision distance measurements on reflective surfaces. Especially for medical applications, such as ophthalmologic diagnosis and monitoring, OCT has proved a valuable tool, since it allows precise and non-invasive measurements down to several millimeters under the surface of the body. Moreover, a high longitudinal precision of a measurement, on a few-micrometer scale, can be achieved even at a relatively long distance between the OCT apparatus and the measured object.

A single OCT measurement usually provides information only about average characteristics of the reflecting area. However, a topography of a reflecting surface can be resolved in great detail, if for a single measurement the size of the measured area is reduced as far as possible and if a multitude of such point-like measurements are performed densely distributed over the surface. In established OCT techniques, an extended surface measurement is thus typically performed in the manner of an x-y-scan, also named "B-scan", on a grid of equally spaced measuring points. For the single point measurements, however, various techniques of optical coherence tomography have been developed to optically determine the distance between the measured point and a reference point, typically inside the OCT device.

Conventional methods of OCT may involve an interferometer setup, wherein a generated light beam becomes divided into a sample beam and a reference beam. While the propagation of the reference beam is confined to an interior of the apparatus, the sample beam is emitted from the device towards the measured sample and, after reflection by the sample, re-enters the interferometer. There, the reflected sample beam and the reference beam are superimposed and, if a difference in the path length of the two beams lies below a coherence length of the used light, the superposition of the beams will produce detectable interference. After detection by means such as a photo-diode or a spectrograph, the interference can be analyzed, for example, with regard to a difference in the spectral intensity or a difference in the path length of the two beams. As a result of that analysis various sample characteristics, such as a reflectivity and a distance, of the reflecting surface can be determined. Aside from single surfaces, the described techniques also allow for simultaneous characterization of a plurality of stacked and partially reflective planes in the sample.

Despite the aforementioned common features, practical OCT apparatus may differ from one another, for example, in the details of their setup, in the use of a wide or a narrow bandwidth light source, in the detected or the analyzed signal characteristics, in the employed analyzing algorithm, etc. According to a conventional classification scheme, OCT techniques may be distinguished by their setup, into "sequential" techniques, if a measurement includes a plurality of detection processes with a controlled variation of the optical path length of the reference arm ("scanning-arm") or of the used wavelength ("swept source"), and into "simultaneous" techniques, if a measurement may be performed by a single detection process only, in which cases usually a spectrogram of the superimposed reference and sample beams is recorded. Alternatively, OCT techniques may be distinguished by the prevailing method of data acquisition and processing, into what is called "time domain OCT", TD-OCT, which is usually performed in connection with an interferometer of the scanning-arm type, and into "frequency domain OCT", FD-OCT, which includes a processing of spectrally resolved interference information.

Recently, a variant of frequency domain, FD-, OCT has been suggested, which became known as "dispersion encoded full range optical coherence tomography", DEFR-OCT. In DEFR-OCT, a well-defined difference in dispersion between the two interferometer arms is purposefully introduced. In connection with particular processing algorithms, that dispersion imbalance has been shown to allow for a more efficient and convenient retrieval of the depth information from a Fourier-transformed spectrogram.

SUMMARY

While the above described techniques thus provide a wide range of possible embodiments, each of them requires meticulous control over the optical path length in each of the interferometer arms. This is either because of the very short coherence length of the detected light, which defines the range in which interference of the beams can be detected, or due to the limitation that is set by the spectrometer in resolving higher order interference fringes. For the construction of an OCT apparatus, therefore, a fine adjustment of the optical path length of every detected wavelength in each of the interferometer arms is required. This includes an accurate adjustment both of the geometric length of the interferometer arms and also of a wavelength dependency of the optical path length in the arms as a result of dispersion. An imbalance of the dispersion between the two arms is often unavoidably induced by different optical components, such as beam guiding or focusing means, that are used in either of the arms. A balancing of that unavoidable dispersion is then typically performed by inserting additional dispersive components in order to compensate for a previous difference in dispersion.

While DEFR-OCT thus allows for an unequal dispersion in the two arms, this dispersion inequality is nevertheless achieved by increasing, in a well-controlled manner, the dispersion in one of the arms of a balanced interferometer.

By consequence, any of the aforementioned techniques for optical coherence tomography requires thorough control and adjustment of the dispersion in the OCT apparatus. In addition, the different techniques pose different demands to the potential and the quality of the used components, and to the complexity of the setup and of the data processing. These aspects affect the manufacturing costs of an OCT apparatus, and also the range and the convenience of possible applications of an OCT apparatus.

A technique for a simpler setup of an OCT apparatus, which allows for efficient and convenient OCT measurements, is therefore desirable.

The present invention aims at fulfilling one or more of the aforementioned needs.

According to a first aspect, an apparatus for optical coherence tomography is provided, the apparatus comprising a light source; a first arm including a first dispersive optical assembly inducing a first amount of dispersion into light coming from the light source and traversing the first arm, the first arm configuring one of a sample arm and a reference arm of an interferometer; a second arm including a second dispersive optical assembly inducing a second amount of dispersion into light coming from the light source and traversing the second arm, the second arm configuring the other of the sample arm and reference arm, the second amount of dispersion being larger than the first amount of dispersion; a processing unit configured to process an interferometry signal to perform Dispersion Encoded Full Range optical coherence tomography, the interferometry signal representative of a superposition of the light from the first arm and the light from the second arm, wherein for any sub-assembly of one or more optical elements of the second dispersive optical assembly an amount of dispersion induced by the sub-assembly into the light traversing the second arm is different from the first amount of dispersion.

The inventors have realized that phase information can be efficiently filtered from a Fourier-transformed spectrogram even without exact knowledge of a dispersion imbalance. Thus, the described apparatus requires at no stage of its production an equalized dispersion in its two arms. This allows for a simpler and cheaper manufacturing of an OCT apparatus.

The second amount of dispersion may be larger than the first amount of dispersion by an amount corresponding to an amount of dispersion induced by at least 1 cm thickness of a transparent material into light from the light source. A corresponding amount of dispersion may be induced at least partly by a collimator and/or an objective lens in the sample arm.

The one or more optical elements of the second dispersive optical assembly may comprise at least one of a mirror, a beam splitter, an objective lens, a collimator, an optical fiber and a fiber Bragg grating.

According to another aspect, a method for manufacturing an optical coherence tomography apparatus is provided, the method comprising steps of providing a first arm including a first dispersive optical assembly inducing a first amount of dispersion into light coming from a light source and traversing the first arm, the first arm configuring one of a sample arm and a reference arm of an interferometer; providing a second arm including a second dispersive optical assembly inducing a second amount of dispersion into light coming from the light source and traversing the second arm, the second arm configuring the other of the sample arm and reference arm, the second amount of dispersion being substantially equal to the first amount of dispersion; providing a substitute optical component; modifying one of the first and second arms by replacing at least one optical component in the one of the first and second arms with the substitute optical component to thereby change the amount of dispersion of the one of the first and second arms; and providing a processing unit configured to process an interferometry signal to perform Dispersion Encoded Full Range optical coherence tomography, the interferometry signal representative of a superposition of the light from the modified and the other of the first and second arms.

Based on the aforementioned finding that phase information can be efficiently filtered from a Fourier-transformed spectrogram also without exact knowledge of a dispersion imbalance between the arms of the interferometer, the described method allows for a simple and cheap modification of a conventional, i.e., dispersion controlled, OCT apparatus for use with dispersion encoded full range, DEFR–, OCT.

According to embodiments, the modifying step may include replacing at least one of a mirror, a beam splitter, an objective lens, a collimator, an optical fiber and a fiber Bragg grating with the substitute optical component. The substitute optical component, in turn, may also be at least one of a mirror, a beam splitter, an objective lens, a collimator, an optical fiber and a fiber Bragg grating, respectively, having a different dispersion than the replaced at least one optical component.

In the modifying step, replacing the at least one optical component may cause no increase of a mean optical path length difference between the reference arm and the sample arm larger than a scan depth of the OCT apparatus.

In embodiments, the method comprises a step of adapting at least one of the first and second arms to a changed optical path length in accordance with the replacement of the at least one optical component.

BRIEF DESCRIPTION OF THE DRAWINGS

Further details, characteristics and advantages of the invention may become clearer from the following description of exemplary embodiments and from the accompanying drawings. It the drawings.

DETAILED DESCRIPTION

In the following description, which is provided for purposes of explanation only and is not intended to be limiting, specific details are set forth, such as specific device configurations and specific methods, steps and functionalities, in order to provide a thorough understanding of the technique presented herein. It will be appreciated that this technique may be practiced in other embodiments that depart from these specific details.

Figure 1:
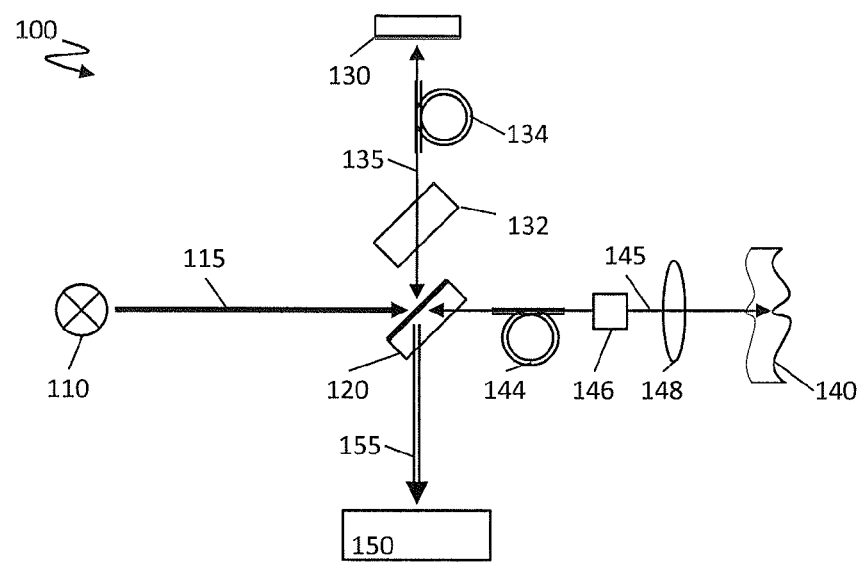
FIG. 1 shows a schematic illustration of an exemplary embodiment of an apparatus for optical coherence tomography exhibiting balanced dispersion.

FIG. 1 shows an example setup of an interferometer 100, as it may be used for optical coherence tomography. The interferometer 100 comprises, as its basic components, a light source 110, a beam splitter 120, a reference mirror 130, and a detector 150. The interferometer 100 further comprises a compensation member 132, e.g., a compensation glass, a reference beam guide 134, a sample beam guide 144, a collimator 146 and an objective lens 148 for focusing light onto a sample 140.

A light beam 115 coming from the light source 110 is divided at the beam splitter 120 into a reference beam 135 and a sample beam 145. The reference beam 135 is directed towards the reference mirror 130, from where it is reflected back to the beam splitter 120. The sample beam 145, by contrast, is emitted from the interferometer 100 and, for example, is directed towards an external sample 140. The sample beam 145 is at least partly reflected at the sample 140 and returns to the beam splitter 120. For the reflected reference beam 135 and sample beam 145 the beam splitter 120 acts as a beam combiner that superimposes parts of the reference beam 135 and of the sample beam 145 into a signal beam 155. The signal beam 155 is directed towards the detector 150, which detects an intensity of the signal beam 155 as a result of the superposition of the reference beam 135 and the sample beam 145. In the case that a difference between the optical path length in the reference arm 135 and the sample arm 145 is less than a coherence length of the detected light, the two beams that constitute the signal beam 155 interfere. Correspondingly, a modulation of the intensity of the signal beam 155 as a function of a varying distance of the sample 140 from the beam splitter 120 can be detected and the sample's varying distance can thus be determined.

The interferometer 100 further comprises reference beam guiding member 134 and sample beam guiding member 144, illustrated in FIG. 1 as fibers. In alternative embodiments, guiding members can be included in any of the four branches of the interferometer 100. Moreover, beam guiding members 134, 144 do not need to be realized as fibers but can also include mirrors, grating arrangements etc.

The interferometer 100 further includes a collimator 146 which is arranged between the sample beam guiding member 144 and the sample 140. The collimator 146 serves to improve the detectable interference signal by counteracting a diffusion or divergence of light either due to a diffuse light source 110 or as induced by other optical components in the setup. The shown collimator 146 represents exemplarily any kind of collimation means which, in alternative embodiments, may again be arranged at various places in the interferometer 100 or may also be dispensed with. Moreover, the interferometer 100 includes the beam focusing member 148, which may be realized by an objective lens and which serves to focus the sample beam onto a smaller area on the surface of the sample 140.

Optionally, an interferometer 100 of the described type may further comprise elements for lateral deflection of the focused sample beam, in order to facilitate the scanning of the beam over an extended area of the sample 140. Furthermore, in alternative embodiments, elements for a longitudinal adjustment of the reference beam are provided, in order to adapt the length of the reference beam to a given distance of the sample 140 from the beam splitter 120.

In FIG. 1 different functionalities, such as beam splitting, beam guiding or beam shaping, are realized by particular components. In alternative embodiments, these functions may be realized by other components, while also further functionalities may be added, such as filters or tunable light sources. Moreover, several of the illustrated functionalities may be realized by a single component, such as a fiber beam splitter, etc. It is further only for simplicity that the interferometer 100 in FIG. 1 is shown as a Michelson interferometer. Various types of interferometers could be used for optical coherence tomography without departing from the above described principles.

Irrespective of the aforementioned variations, FIG. 1 generally illustrates that an optical path of the sample beam 145 may be affected by different optical components than an optical path of the reference beam 135. This is shown in FIG. 1 by the collimator 146, the objective lens 148 and the asymmetric layout of the beam splitter 120, each of which induces dispersion into the sample beam 145 but not into the reference beam 135. As mentioned before, the finite band width of the detected light and the sensitive dependency of a resultant interference on a present dispersion typically necessitate provisions to be made for compensating or equalizing the dispersion in the reference arm and in the sample arm of an OCT apparatus. For that purpose, FIG. 1 shows in the reference arm a compensation member 132, e.g., a compensation glass, which is meant to compensate for a dispersion imbalance induced into the sample arm by a substrate of the beam splitter 120, the collimator 146 and the objective lens 148. As illustrated by the arrangement of the compensation member 132, a finer adjustment of the dispersion can be achieved by tilting the member 132 and thereby vary a geometric path length of the reference beam through the compensation member 132. In alternative embodiments, compensation of a dispersion imbalance may also be adjusted by a plurality of compensation members 132, for example by adding or removing single dispersive compensation members 132 until a balance between the two beams 135, 145 is achieved.

Figure 2:
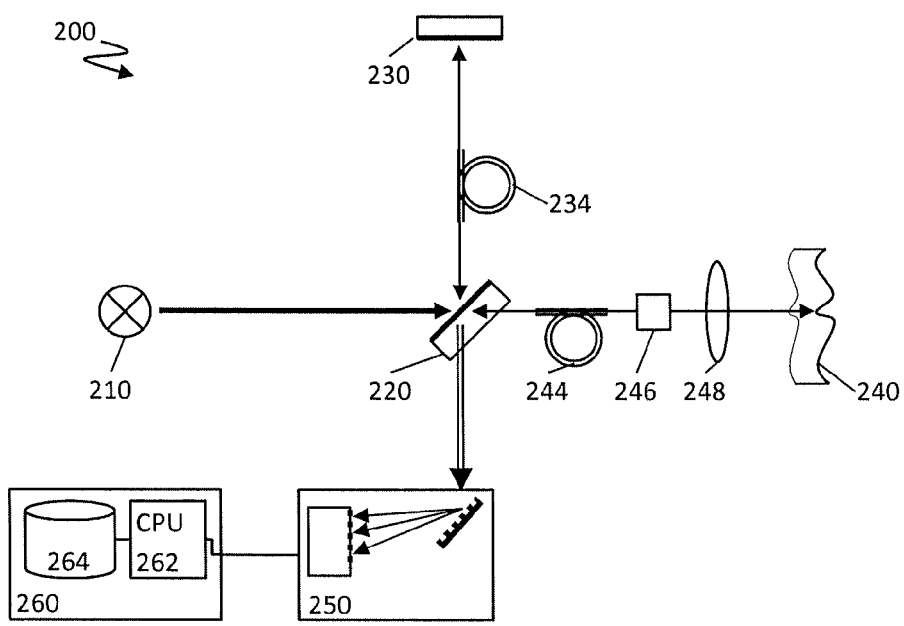
FIG. 2 shows a schematic illustration of an exemplary embodiment of an apparatus for optical coherence tomography exhibiting unbalanced dispersion.

FIG. 2 shows an exemplary embodiment of an OCT apparatus 200 according to the present invention. Similar to the apparatus 100 of FIG. 1 the OCT apparatus 200 of FIG. 2 comprises a light source 210, a beam splitter 220, a reference mirror 230, a reference beam guiding member 234, a sample beam guiding member 244, a collimator 246, an objective lens 248 for focusing light onto a sample 240, and a detector 250. In addition, the OCT apparatus 200 of FIG. 2 comprises an evaluation unit 260 including a central processing unit, CPU, 262 and a storage unit 264.

Different from the OCT apparatus 100 of FIG. 1, the OCT apparatus 200 of FIG. 2 includes no compensation member 132 to compensate for a dispersion imbalance, and it is configured to obtain spectrally resolved interference information, for example, in the form of a spectrogram. Concerning further variations of the OCT apparatus 200 the same reasoning applies as in connection with the apparatus 100 of FIG. 1. In particular, the following discussion of inventive aspects may be applied correspondingly to other interferometric principles than a Michelson interferometer.

As indicated in FIG. 2 spectrally resolved interference information can be obtained by using a light source 210 with a relatively broad bandwidth and an element for spectral resolution included in the detector 250 or at any other place of the set-up. Alternatively, the light source 210 may be configured as a narrow bandwidth light source with a tunable central wavelength, while a spectrogram is obtained over a certain time interval during which the light source 210 is being tuned through the relevant spectrum.

Upon retrieval of spectrally resolved interference information by the detector 250, such information is transmitted from the detector 250 to the evaluation unit 260. The evaluation unit 260 is configured to perform dispersion encoded full range optical coherence tomography, DEFR-OCT, on the transmitted data. The evaluation unit 260 comprises the central processing unit 262, which is programmed to apply a DEFR-OCT algorithm on the spectrally resolved interference information. For that purpose the central processing unit 262 is programmed by suitable software that is stored by the storage unit 264.

Typically based on well-tuned dispersion parameters of the setup, DEFR-OCT allows, from a single spectrogram with ambivalent phase information, to obtain distinctive knowledge about the depth of individual sample reflections. This applies also to signal components which arise from reflections at various distances shorter and longer than the reference length of the sample arm. To this end DEFR-OCT exploits the circumstance that knowledge about a finite dispersion in an interferometer set-up enables one to largely resolve the phase ambivalence of a recorded spectrogram. Dispersion parameters of a current setup may be measured, or otherwise determined, beforehand and later become introduced into the data processing, typically in a step of numerical dispersion compensation, NDC.

In conventional realizations of DEFR-OCT, a resultant dispersion imbalance in the setup is carefully adjusted. In contrast to this, the present invention utilizes the discovery that dispersion parameters may vary over an unexpectedly broad range to still enable a DEFR-OCT algorithm to provide sufficiently accurate results. While this allows for a much simpler construction of a DEFR-OCT apparatus, a large dispersion tolerance has been found especially for a preferred combination of particular NDC and DEFR algorithms, as will be described in the sequel.

In the presence of dispersion, the amount of interference between sample and reference beams of an interferometer, as represented in a recorded spectrogram, can be described as:

$$I(\omega) = E_S^* E_R e^{i(\frac{\omega z}{c} + \varphi_d(\omega))} + E_S E_R^* e^{-i(\frac{\omega z}{c} + \varphi_d(\omega))}$$

wherein $E_S$ and $E_R$ describe the interfering electric fields of the sample beam and the reference beam, respectively, z is the difference in path length between the two beams and $\varphi_d(\omega)$ is a phase shift which is caused by the difference in dispersion between the sample arm and the reference arm.

Figure 3A:
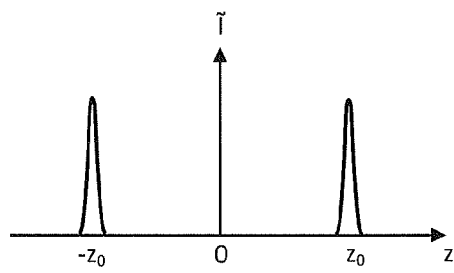
FIGS. 3a to 3c show Fourier-transformed spectrograms with a changing influence of dispersion.

As shown in FIG. 3a, in the absence of a dispersion imbalance, i.e., with $\varphi_d(\omega)=0$, a thus defined spectrogram may provide corresponding, though ambivalent, depth information $+/-z_0$, for example, if the spectrogram, after eventual pre-processing, is subjected to a Fourier transformation. In that case, two identical signal bands will be generated in the positive and in the negative z range, equidistant from the central reference length, wherein one of the bands represents the "true" signal and the other one its conjugate artifact.

Figure 3B:
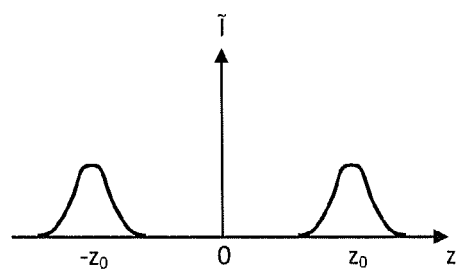

In the presence of dispersion, as shown in FIG. 3b, a depth, or: z-, signal which is obtained in that way will appear smeared out due to the dispersion term in the above equation, while the result remains to be indistinct with respect to a positive or a negative depth. Moreover, in the typical case that reflections, i.e., "true" signal bands, occur on either side of the reference length, true and conjugate bands in the transformed spectrogram often overlap. Processing a spectrogram in the described manner may then not allow for a distinction between components of true signals and artifacts.

In view of these drawbacks, techniques of numerical dispersion compensation, NDC, were shown to be suited for both, compensating for the smearing in order to yield more precise depth information and at the same time providing criteria for distinguishing a true signal from its artifact. According to a preferred technique, if $\varphi_d(\omega)$, i.e., the effect of a dispersion imbalance in the above equation, is known, the equation can be multiplied by a corresponding correction term, $e^{-i(\varphi_d(\omega))}$. In this manner a dispersion-compensated true signal component is produced, while at the same time due to this measure the artifact component will experience a doubled dispersion-related phase shift:

$$\hat{I}(\omega) = \underbrace{E_S^* E_R e^{i(\frac{\omega z}{c})}}_{\text{True Signal}} + \underbrace{E_S E_R^* e^{-i(\frac{\omega z}{c} + 2\varphi_d(\omega))}}_{\text{Artifact}}$$

Figure 3C:
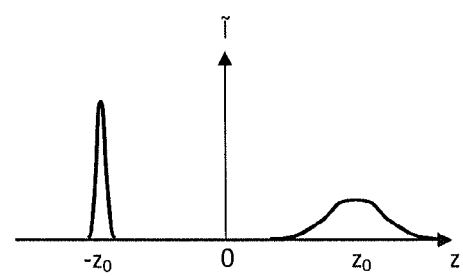

If a thus modified spectrogram is subjected to the above described processing, the true signal band will no longer appear smeared out, whereas its artifact will be smeared out even stronger due to the greater dispersion term. As illustrated in FIG. 3c, the true signal thus becomes distinguishable from its artifact. Suitable further processing, for example, by means of DEFR-OCT techniques, may thus allow one to separate, or filter, the conjugate bands from one another.

As a prerequisite of the above processing, different methods of determining $\varphi_d(\omega)$ for a given setup and of its use in connection with NDC have been described, for example, by Wojtkowski et al.: "Ultrahigh-resolution, high-speed, Fourier domain optical coherence tomography and methods for dispersion compensation", in Optics Express, vol. 12, no. 11, 2004, pp. 2404-2422, and by Marks et al.: "Autofocus algorithm for dispersion correction in optical coherence tomography", in Applied Optics, vol. 42, no. 16, 2003, pp. 3038-3046. For the present invention, the iterative method of Wojtkowski et al., as described in section 2 of the cited publication, proved to be the most advantageous. Moreover, it could be shown that for most practical applications it is sufficient to determine $\varphi_d(\omega)$ merely once, at the beginning of each OCT application, after the apparatus and the sample have become aligned.

It has further been found that DEFR-OCT can still provide accurate results even in the presence of a comparatively large and/or inhomogeneous dispersion imbalance in the setup. This applies in particular if an iterative filtering of true signal components from their artifacts is used. A preferred method of this kind is described, for example, by Hofer et al.: "Fast dispersion encoded full range optical coherence tomography for retinal imaging at 800 nm and 1060 nm", in Optics Express, vol. 18, no. 5, 2010, pp. 4898-4919. Further DEFR techniques are described, for example, by Koettig et al.: "An advanced algorithm for dispersion encoded full range frequency domain optical coherence tomography", in Optics Express, vol. 20, no. 22, 2012, pp. 24925-24948.

For the present invention, the described combination of particular NDC and DEFR algorithms proved to be most advantageous. However, it will be appreciated that variations from the aforementioned techniques or from their preferred combination may also be suited to provide acceptable results.

It has further been found that the described DEFR-OCT technique works well with a dispersion imbalance as it may typically result from an assembly of the optical components of an interferometer setup without specific dispersion matching. It is therefore not necessary to provide elements, or to take any other precautions, for equalizing dispersion in the two arms at any stage of the manufacture/assembly of the OCT apparatus 200. Each of the reference arm and the sample arm therefore contains an optical assembly that induces an individual amount of dispersion into traversing light. Since at no stage of the manufacturing process of the OCT apparatus 200 a balancing of dispersion is necessary, no combination, or subassembly, of dispersive optical components in each of the two arms will induce the same amount of dispersion into that arm as does any subassembly of dispersive optical components in the other arm, respectively.

At the same time, the suggested DEFR-OCT algorithm requires, for satisfactory results, a certain least difference in dispersion between the two arms. It has been found from experiments that a favorable amount of imbalance in dispersion corresponds to a dispersion that is induced by 1 cm or more of transparent material, such as glass, fiber optics or transparent plastic. A favorable amount of dispersion is thus naturally obtained already by the conventional use of optical components in the sample beam, such as the objective lens or a collimator. As the desired dispersion difference is thus a natural byproduct of the manufacturing of the OCT apparatus 200, the present technique further facilitates the construction of an OCT apparatus 200.

Alternatively, the desired difference in dispersion can be achieved by varying other optical components, for example the length of optical fibers that are used in the reference arm and/or the sample arm.

The present invention not only facilitates the production of a new OCT apparatus; it also allows convenient re-configuration of a conventional, i.e., a balanced, OCT apparatus to become used for DEFR-OCT.

Figure 4:
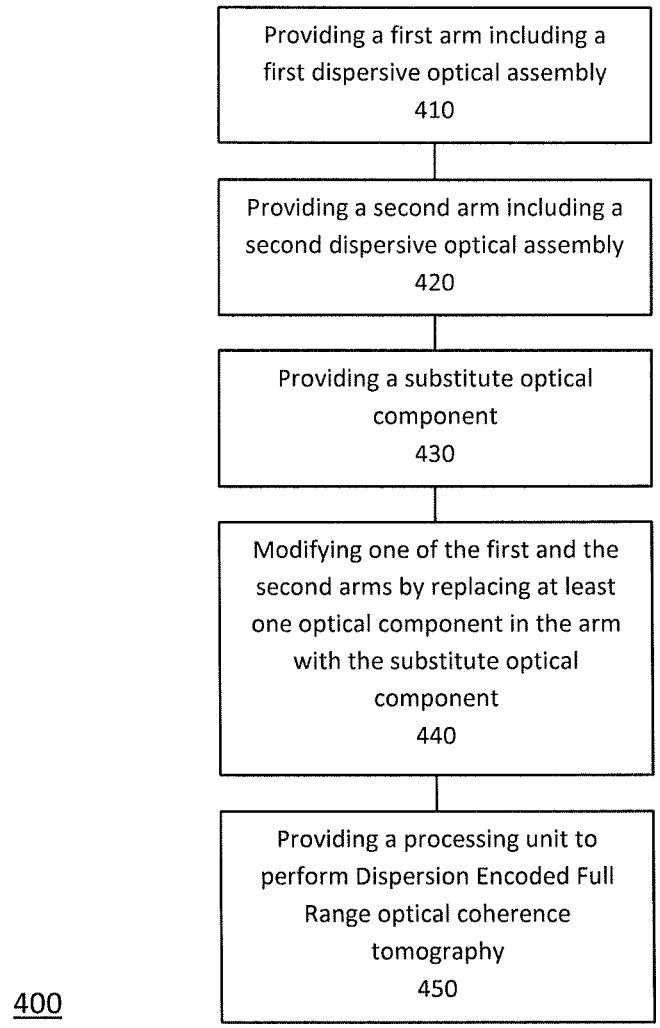
FIG. 4 is a flowchart of an exemplary embodiment of a method for manufacturing an optical coherence tomography apparatus.

FIG. 4 shows a flow chart of an exemplary embodiment of a method 400 for manufacturing an optical coherence tomography apparatus according to the present invention.

The method 400 comprises, as a first step 410, providing a first arm including a first dispersive optical assembly inducing a first amount of dispersion into light coming from the light source and traversing the first arm, the first arm configuring one of a sample arm and a reference arm of an interferometer. Similarly, as a second step 420, the method 400 comprises the step of providing a second arm including a second dispersive optical assembly inducing a second amount of dispersion into light coming from the light source and traversing the second arm, the second arm configuring the other of the sample arm and reference arm, the second amount of dispersion being substantially equal to the first amount of dispersion. The method 400 further includes providing a substitute optical component, step 430, and modifying one of the first and second arms by replacing at least one optical component in the one of the first and second arms with the substitute optical component to thereby change the amount of dispersion of the one of the first and second arms. Finally, the method 400 includes providing a processing unit configured to process an interferometry signal to perform dispersion encoded full range optical coherence tomography, the interferometry signal representative of a superposition of the light from the modified and the other of the first and second arms, step 450.

The method 400 as shown in FIG. 4 thus describes, for example, how a conventional OCT apparatus in which the reference arm and the sample arm have essentially the same dispersion can be made suitable for dispersion encoded full range optical coherence tomography. According to the method 400 the re-configuration is achieved by replacing an optical component with an equivalent that has a different dispersion and thereby intentionally reverse a previous balancing of the dispersion. In addition, a processing unit that is suitable to subject an acquired spectrogram to dispersion encoded full range OCT is provided, either by adding a corresponding processing unit to the apparatus or by reconfiguring an existing processing unit to evaluate an acquired signal in a corresponding manner.

Figure 5:
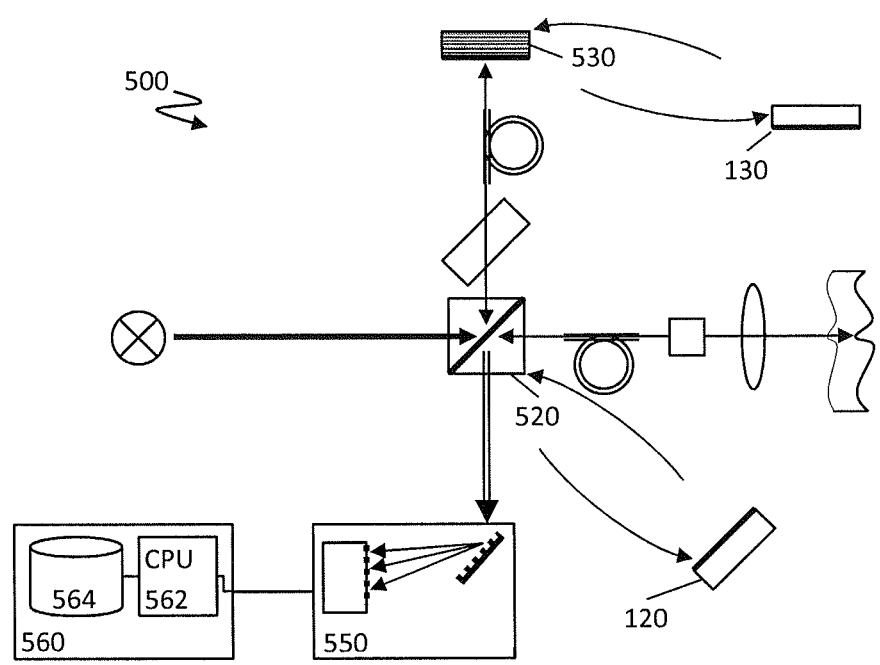
FIG. 5 is a schematic illustration of an exemplary embodiment of a method for manufacturing an optical coherence tomography apparatus.

FIG. 5 shows an exemplary embodiment of the method 400 applied to the apparatus 100 of FIG. 1.

As described earlier in connection with FIG. 1, in the OCT apparatus 100 the reference arm and the sample arm have been balanced with regard to their dispersion by the compensation member 132. In particular, the OCT apparatus 100 of FIG. 1 provides a first arm including a first dispersive optical assembly and a second arm including a second dispersive optical assembly wherein the amount of dispersion that is induced in the first arm is substantially equal to the amount of dispersion that is induced into the other arm. FIG. 5 further shows how, in accordance with the present invention, the substitute optical component 530, 520 is provided and one of the two arms is modified by replacing at least one optical component 130, 120 in the arm with the substitute optical component 530, 520.

In the example shown in FIG. 5, an optical component that is replaced may be the reference mirror 130 or the beam splitter 120. Accordingly, the reference mirror 130 is replaced with a dispersive multilayer mirror 530 and the planar beam splitter 120 is replaced with a cubic beam splitter 520, so that, as shown in FIG. 5, especially the dispersion in the reference arm is changed by the shown replacements. Alternatively, any other component in any of the two arms may be replaced with a suitable component that would serve a similar function as the original component while inducing a different amount of dispersion into the corresponding arm.

Further, the OCT apparatus 500 of FIG. 5 includes also a detector 550 and an evaluation unit 560, the latter comprising a central processing unit 562 and a storage unit 564 and being configured to process spectral interference information according to a dispersion encoded full range OCT algorithm.

Advantageously, the optical component to be replaced includes a mirror, a beam splitter, an objective lens, a collimator, an optical fiber or a fiber bragg grating. If applicable, however, the present technique could also be realized by replacing any other optical component of an OCT apparatus if that replacing is suited to change a difference in dispersion between the interferometer arms.

Preferably, the replacement of an optical component in a given OCT apparatus according to the present technique does not necessitate readjustment of that apparatus due to a changed optical path length in any of the arms. In particular, it would be preferable if a change of the optical path length would not be larger than a scan depth of the OCT apparatus. However, if necessary, a corresponding adaptation of either of the two arms to a changed optical path length in accordance with a replacement of the optical component can be performed. In that case the method 400 of FIG. 4 would further comprise the step of adapting the optical path length in at least one of the two arms.

The present invention has been described in connection with a particular evaluation technique, which has become known as Dispersion Encoded Full Range OCT. It will be apparent, however, that the invention may be used with equal or similar advantages in connection with any comparable technique that is available today or in the future.

The invention claimed is:

1. An apparatus for optical coherence tomography, the apparatus comprising:
    a light source;
    a first arm comprising a first dispersive optical assembly configured to induce a first amount of dispersion into light coming from the light source and traversing the first arm, the first arm being one of a sample arm and a reference arm of an interferometer;
    a second arm comprising a second dispersive optical assembly configured to induce a second amount of dispersion into light coming from the light source and traversing the second arm, the second arm being the other of the sample arm and reference arm, the second amount of dispersion larger than the first amount of dispersion, the second dispersive optical assembly comprising one or more optical elements, any subassembly of the one or more optical elements inducing an amount of dispersion into the light traversing the second arm that is different from the first amount of dispersion yielding a dispersion imbalance; and a processing unit configured to process an interferometry signal to perform Dispersion Encoded Full Range optical coherence tomography without exact knowledge of the dispersion imbalance, the interferometry signal representative of a superposition of the light from the first arm and the light from the second arm.

2. The apparatus of claim 1, wherein the second amount of dispersion is larger than the first amount of dispersion by an amount corresponding to an amount of dispersion induced into light from the light source by at least 1 cm thickness of a transparent material.

3. The apparatus of claim 1, wherein the one or more optical elements of the second dispersive optical assembly comprise at least one of a mirror, a beam splitter, an objective lens, a collimator, an optical fiber, and a fiber Bragg grating.

4. A method for manufacturing an optical coherence tomography apparatus, the method comprising steps of:

providing a first arm including a first dispersive optical assembly inducing a first amount of dispersion into light coming from a light source and traversing the first arm, the first arm being one of a sample arm and a reference arm of an interferometer;

providing a second arm including a second dispersive optical assembly inducing a second amount of dispersion into light coming from the light source and traversing the second arm, the second arm being the other of the sample arm and reference arm, the second amount of dispersion substantially equal to the first amount of dispersion;

providing a substitute optical component;

modifying one of the first and second arms by replacing at least one optical component in the one of the first and second arms with the substitute optical component to thereby change the amount of dispersion of the one of the first and second arms that yields a dispersion imbalance; and providing a processing unit configured to process an interferometry signal to perform Dispersion Encoded Full Range optical coherence tomography without exact knowledge of the dispersion imbalance, the interferometry signal representative of a superposition of the light from the modified and the other of the first and second arms.

5. The method of claim 4, wherein the modifying step includes replacing at least one of a mirror, a beam splitter, an objective lens, a collimator, an optical fiber, and a fiber Bragg grating with the substitute optical component.

6. The method of claim 4, wherein in the modifying step, replacing the at least one optical component causes no increase of a mean optical path length difference between the reference arm and the sample arm larger than a scan depth of the OCT apparatus.

7. The method of claim 4, comprising a step of:

adapting at least one of the first and second arms to a changed optical path length in accordance with the replacement of the at least one optical component.

* * * * *